Patented Sept. 17, 1935

2,014,760

UNITED STATES PATENT OFFICE 2,014,760

PAINT, LITHOGRAPHIC VARNISH, PRINTING INK, AND THE LIKE AND PROCESS OF MAKING SAME

Wilfred Graham Dewsbury, London, and Arnold Davies, West Norwood, London, England No Drawing. Application October 29, 1934, Serial No. 750,590. In Great Britain October 18, 1934

7 Claims. (Cl. 134—39)

This invention relates to paints, lithographic varnishes, printing inks and the like, and process of making same.

It is an object of this invention to provide paints, lithographic varnishes, printing inks and the like which are characterized by improved fluidity at a rate of shear characteristic of practical painting or printing, with increased levelling properties.

It is a further object of this invention to provide lithographic varnishes, in particular for bronze printing, in the use of which the bronzes form in an improved manner an apparently continuous brilliant film over the entire free surface.

The process in accordance with this invention comprises several stages. The first stage consists in the production of a dispersion of the hydrophobic phase of a substance of the group comprising glue and gelatine in an oil base suitable for the manufacture of the said paints, varnishes and inks. This is carried out by the treatment of a glue, gelatine or isinglass, in the proportion of about 2–5%, with such an oil base at a temperature of about 130° C. until a mass of fibres separates and the isolation of the liquid product from the residue. In this process polymerized vegetable oils of the drying type, such as linseed, tung and perilla oils, can be used and in general customary vehicles for the production of the required final products so long as they boil above 130° C.

In a further stage the dispersion thus produced is mixed with finely divided graphite in a proportion of the order of 0.5%, but in any case not more than about 1% of graphite, and the graphite is reduced to colloidal dimensions by grinding in suitable mills. The product as such or after mixing with a further quantity of polymerized vegetable drying oils provides a vehicle for the production of the improved products.

The addition of graphite in such a proportion as set out above causes no apparent alteration in the colour of paints, varnishes and of those containing bright coloured pigments.

The following example illustrates the invention:—

A polymerized linseed oil, having an iodine value within the limits customarily specified for lithographic inks, is heated to 130° C. with 2–5% by weight of glue, gelatine or isinglass, preferably in thin sheets, until a mass of tangled fibres has separated. The liquid product is separated from the fibres and to it is added 0.5% of finely divided graphite. The product is milled in the customary manner in order to produce a colloidal suspension of graphite and the product is employed as a final vehicle for the production of lithographic varnishes.

A lithographic varnish is produced for instance by incorporating with the said vehicle 50% of its weight of a stamped bronze powder such as aluminium and bronzes known in the trade for the production of so-called gold and silver inks.

What we claim is:—

1. Process for the manufacture of paints, lithographic varnishes, printing inks and the like comprising heating a polymerized vegetable drying oil to about 130° C. with about 2–5% of a substance of the group comprising glue, gelatine and isinglass until a mass of fibres has separated, isolating the liquid product, adding about 0.5% and not more than about 1% of finely divided graphite thereto, milling the mixture until the graphite has been brought to colloidal dimensions and incorporating a pigment with the vehicle thus produced.

2. Process according to claim 1 in which a powder of the type termed bronze powders is employed as pigment.

3. Process for the manufacture of paints, lithographic varnishes, printing inks and the like comprising heating a vehicle therefor to about 130° C. with a substance of the type of glue until a mass of fibres has separated, isolating the liquid product, adding about 0.5% and not more than about 1% of finely divided graphite thereto, milling the mixture until the graphite has been brought to colloidal dimensions and incorporating a pigment with the vehicle thus produced.

4. Process for the manufacture of a vehicle for incorporation into paints, lithographic varnishes, printing inks and the like, comprising heating a vegetable drying oil to about 130° C. with a substance of the group comprising glue, gelatine and isinglass until a mass of fibres has separated, isolating the liquid product, adding about 0.5% and not more than about 1% of finely divided graphite thereto and milling the mixture until the graphite has been brought to colloidal dimensions.

5. Process for the manufacture of so-called gold and silver lithographic varnishes and printing inks, comprising heating polymerized linseed oil to about 130° C. with 2–5% of a substance of the type of glue until a mass of fibres has separated, isolating the liquid product, adding about 0.5% and not more than about 1% of finely divided graphite thereto, milling the mixture until the graphite has been brought to colloidal dimensions and incorporating with the vehicle thus produced a metal bronze powder.

6. A vehicle for paints, lithographic varnishes and printing inks comprising a polymerized vegetable oil having dispersed therein the hydrophobic phase of a substance of the type of glue and having in colloidal suspension about 0.5% and not more than about 1% of graphite.

7. Paints, lithographic varnishes and printing inks comprising a polymerized vegetable oil having dispersed therein the hydrophobic phase of a substance of the type of glue, having in colloidal suspension about 0.5% and not more than about 1% of graphite and being incorporated with a pigment.

WILFRED GRAHAM DEWSBURY.
ARNOLD DAVIES.